United States Patent [19]

Wendt

[11] Patent Number: 4,851,178

[45] Date of Patent: Jul. 25, 1989

[54] PROCESS FOR THERMOFORMING PLASTIC MATERIALS SUCH AS PET

[76] Inventor: Michael L. Wendt, 1382 E. Hull Rd., Hope, Mich. 48628

[21] Appl. No.: 129,057

[22] Filed: Dec. 7, 1987

[51] Int. Cl.[4] .............................................. B29C 51/10
[52] U.S. Cl. .................... 264/547; 264/553; 264/549; 425/384; 425/388
[58] Field of Search ................. 264/519–522, 264/544, 547–549, 553, 554; 425/384, 387.1, 388

[56] References Cited

U.S. PATENT DOCUMENTS

| | | | |
|---|---|---|---|
| 2,123,552 | 7/1938 | Helwig | 425/387.1 |
| 3,429,854 | 2/1969 | Siggel | 264/547 |
| 3,482,281 | 12/1969 | Thiel | 425/388 |
| 3,496,143 | 2/1970 | Siggel | 264/547 |
| 4,466,845 | 8/1984 | Fortuna | 264/551 |
| 4,552,717 | 11/1985 | Murley et al. | 264/549 |
| 4,666,394 | 5/1987 | Wakamiya et al. | 264/549 |

Primary Examiner—Jan H. Silbaugh
Assistant Examiner—Jill L. Heitbrink
Attorney, Agent, or Firm—Timothy J. Martin; J. Preston Oxenham

[57] ABSTRACT

The method for thermoforming articles out of a sheet of plastic material including initially applying a negative pressure to the cavity and a first forming gas to the second side of the sheet facing the male mold section, switching to a second pressurizing gas for a period of time to allow a level of crystallization of the conformed sheet, and flowing a cooling stream of gas against the sheet to arrest further crystallation.

12 Claims, 6 Drawing Sheets

PROCESS FOR THERMOFORMING PLASTIC MATERIALS SUCH AS PET

FIELD OF INVENTION

The present invention generally relates to the field of thermoforming sheets of plastic material in a vacuum forming process. More specifically, though, the present invention is directed to an apparatus and a method for thermoforming amorphous polyethylene teraphthalate (PET) into crystallized PET (CPET) articles. As such, this invention addresses a substantial need in providing apparatus and method that enhances the formation of CPET and reduces the cycle times for molding machines producing CPET articles out of a sheet of amorphous PET.

BACKGROUND OF THE INVENTION

The development of plastic materials has resulted in the substantial growth of industry directed to the production of useful articles from this versatile medium. Over the years, this production industry has come to be one of the major sectors of manufacturing commerce in the United States as well as in numerous other countries, as well. The usefulness of plastic materials and the growth of this industry has caused a variety of production techniques to be invented and improved. Examples of different production techniques include injection molding, blow molding and thermoforming, to name a few. The focus of the present invention is on the thermoforming of plastic materials.

Thermoforming, as a production method, broadly contemplates the configuration of a plastic sheet into useful articles by heating a plastic production sheet of material into a plastic state, causing the sheet to conform to the shape of a mold and then cooling the molded article. Although different molding processes have been developed, one of the most widespread techniques in thermoforming plastic sheets is that known as vacuum forming. In this technique, a female cavity is configured into the shape of the article to be formed. A passageway communicates with this cavity and is switchably connected between a vacuum source (negative pressure source) and an air pressure source. The sheet of formable plastic material is then placed over the mouth of the female cavity, and the cavity is connected to the negative pressure source so that the sheet of material is sucked into the cavity and adopts the shape of the cavity. Once the part is formed, the passageway is connected to the pressurized air source so that the formed part is ejected from the mold.

In many applications, this thermoforming technique employs a male plug assist which bears against the surface of the plastic material opposite the female cavity and assist in pushing the sheet into the cavity as the vacuum is applied. Plug assists are typically used for deep cavity molding. The plug assist method and apparatus is useful in that it helps control the distribution, i.e., layer thickness, of the production sheet, as the article is formed since the plug assist tends to stretch the plastic materials. Factors that affect the material distribution during stretching include the degree of plasticity of the production sheet, the size and shape of the plug assist, and the construction material and surface finish of the plug. The factors each can affect the slippage of the material along the plug assist surface.

While a variety of different plastic materials have been utilized in the formation of production articles, one of the more commonly used materials is amorphous polyethylene teraphthalate (PET) traditionally extruded as an amorphous sheet to be thermoformed. In its state, PET is readily adaptable to the various thermoforming techniques and is configured into a vast array of commercial articles having high impact resistance.

Recently, however, the industry has recognized certain commercial value in the transformation of amorphous PET into crystallized polyethylene teraphthalate (CPET) during formation of molded articles. The increased crystallinity of this material results in articles that have increased density and which are more resistant to elevated temperatures. However, the transformation of amorphous PET sheets into CPET articles is the only example known to the inventor of a plastic that is drastically changed in terms of its properties during formation. Thus, virtually every aspect of the production of CPET articles departs substantially from that equipment and techniques used in the thermoforming of amorphous PET and other plastic materials.

While CPET technology may find increasing application in many industries, the food packaging industry has immediately been impacted since the value of CPET containers, especially trays, is readily apparent and since the medium has been approved by the appropriate regulatory agencies. The reason for this positive reception is that CPET trays, due to their higher thermo properties, are suitable for use in both microwave and conventional ovens. Thus, these trays are known as "dual-ovenable" and are employed in the packaging of frozen foods. Not only are CPET trays attractive for table use, these trays are lighter and more stain resistant than heavier thermoset polyester alternatives. One producer of PET material projected that over 2 billion CPET trays will be produced by the year 1990.

As noted above, the transformation of amorphous PET into CPET during thermoforming is not without its problems. As with any production thermoforming process, the production rate of the molding articles are a function of two variables: (1) mold cycle time; and (2) the number of articles produced during each machine cycle. For a given mold size, then, the production rate is directly proportional to the mold cycle time. Therefore, with most man-produced items, manufacturing economies are dictated by the production rate of the items. Accordingly, the production cost of CPET articles is largely a function of mold cycle time.

It has been found desirable that amorphous PET be transformed into CPET having a degree of crystallization between 20% and 40%. Crystallization in turn is a function of temperature and time. To accomplish this desired crystallization during a mold cycle, the amorphous PET sheet is usually first preheated to initiate crystallization and is then formed by a heated molding unit; to do otherwise unnecessarily increases the time the article remains in the heated mold. However, if an excessive amount of initial crystallization occurs, the production sheet becomes stiffer. When the sheet is molded into articles, defects in wall thickness can occur in the articles due to the uneven mechanical stretching of the material by the plug assist and by the lack of flowability of the stiffer sheet over the plug assist. Thus, existing apparatus and methods utilize preheaters which raise the initial crystallinity to approximately seven percent (7%) and, at an upper range of less than ten percent (10%).

Two methods have evolved in molding the production sheet that has some initial level of crystallization. In one method, unheated pressure forming air is applied to the side of this sheet opposite the vacuum cavity as the vacuum is applied to assist in forcing the partially crystallized CPET sheet into the female cavity. This occurs as the plug assist is also advancing into the cavity against the surface of the production sheet. Once in the cavity, the sheet must remain until the desired level of crystallization takes place. This method, called the "single step method" loses cycle time because the unheated pressure forming air cools the production sheet and the plug assist. The pressure forming air is at relative low positive pressure, usually less than 10 psi, to avoid excessive cooling. With this lower pressure, the incoming CPET sheet must have a very low initial crystal content, otherwise the sheet is too stiff for the conforming step. As a result of the lower initial crystallization level, the sheet must remain in the mold cavity longer in order to reach the ultimately desired crystallization level. After a suitable time in the heated mold cavity, the mold is then opened and the part ejected. At this point, the part is still at an elevated temperature, and crystallization continues. Furthermore, since the part is still hot and in a plastic state, warping can occur as a result of gravitational forces. Accordingly, in this method it is difficult to control the level of crystallization, and this technique also can result in over-crystallization of the plastic material since it is difficult to control the rate of cooling of the article when it is ejected from the female mold.

A second method of forming CPET articles is referred to as the "two step process" and is basically the same as the single step method, but adds an identical set of second molds for cooling purposes only. This second set of cold molds close on the molded articles to arrest crystallization and to help prevent warping of the part. This method relies on the accurate indexing of the formed and crystallized hot parts into the second station. Vacuum and pressurized air are used to force the molded parts into contact with the cooling mold. This second method has its own problems since any inaccuracies in the indexing will damage the parts as will the uneven shrinking and distortion of the molded parts. Since good contact is difficult to obtain uniformly over the part, those parts in contact with the cool mold will exhibit arrested crystallization while those areas not making good contact will continue to crystallize to a higher level. Thus, there is a lack of uniformity of crystallization over the volume of the part. This technique is, naturally, more expensive, since it requires an additional second set of cooling molds. Further, the problem in indexing a two step method gets more critical as the size and number of mold cavities increases.

In both the one step method and the two step method, as heretofore practiced, the cycle time of the molding apparatus is retarded. In the one step process, the use of low pressure forming air sometimes results in less intimate contact of the production sheet with the heated female cavity so that there is lower thermal transfer thus slowing the rate of crystallization. Further, contact between the preheated production sheet and the cooler plug assist during the closing of the mold also tends to retard crystallization. This is also true because the pressure forming air is unheated so that flow of the unheated pressure forming air tends to cool both the sheet and the plugs.

In the second method, the crystallization is entirely arrested by the second set of molds. Thus, almost the entire crystallization in the forming process must occur while the part is in the first molded cavity. Thus, the production sheet must remain in the cavity of the first mold for a longer time.

In either case, typical mold cycle times may be as long as 12 seconds. Recent improvements in materials technology accomplished by the addition of nucleating agents into the resin materials used to form the amorphous production sheet, have reduced cycle times to approximately 6 seconds since the nucleating agents enhance the rate of crystallization. However, the use of nucleating agents to increase crystallization rates necessarily increases the expense of the polyester resin used to produce the production sheet. Also, the use of nucleating agents require great control of the preheating of the production sheet to initiate crystallization as the sheet is to be indexed into the mold.

SUMMARY OF THE INVENTION

It is an object of the present invention to provide a new and useful apparatus and method of thermoforming plastic articles.

Another object of the present invention is to provide a more efficient apparatus and method for inducing and controlling the crystallization of amorphous polyethylene teraphthalate into molded plastic articles.

Yet another object of the present invention is to provide an apparatus and method which decreases the thermoforming cycle time for CPET.

A still further object of the present invention is to provide an inexpensive apparatus and method for enhancing the formation of CPET materials which may be provided on original equipment or which may be readily implemented as a modification to existing equipment.

It is a still further object of the present invention to provide an apparatus and method for thermoforming plastic materials to create CPET articles wherein all of the processing parameters are subject to control so as to obtain faster cycle times, improve the forming of molded details in the finished part, and to lessen distortion and disfiguration of the finished part.

Another object of the present invention is to provide a method wherein the final crystallization percent of a formed article out of CPET may be uniform and selectably controllable within a narrow range.

In its broad form, the apparatus according to the present invention, then, comprises a mold formed by a female mold section and a mold section which are reciprocally movable between an open and a closed position. The female mold has one or more cavities each having an interior sidewall configured in the shape of the article to be molded and a first passageway communicating with the interior of a respective cavity. The male mold includes one or more plug assists, in one-to-one correspondence with the female mold cavities, with each plug assist sized for advancement into a respective cavity when the female mold and the male mold sections are moved into the closed position. Each plug assist is provided with one or more inlets extending through the plug assist and one or more second passageways; both the second passageways and the inlets communicate with respective cavities when the mold is in a closed position. Index means is provided for positioning the sheet across the cavities in the open position and means for opening and closing the mold is also provided.

A vacuum source communicates with the first passageway and includes a vacuum switch which may be opened and closed to selectively apply negative pressure to the cavity through the first passageway to draw a portion of the sheet into each respective cavity. A first air source communicates with the inlet and includes a first heating means and a switch which may be opened and closed to selectively apply heated air through the inlet into the cavity under pressure as the mold is moved into the closed position. A second air source communicates with each second passageway and includes a second heating means and a second switch which may be opened and closed to selectably apply heated air through the second passageways into the cavity when the mold is in the closed position. A third air source communicates with the inlet and includes a third switch which may be opened and closed to selectively apply air through the inlet into the cavity at a third pressure and temperature.

In the preferred apparatus, the inlet formed in the plug assist extends axially thereof and may include a restriction orifice that defines a nozzle to direct a flow of air against the work piece. The second passageways are preferably formed laterally around the plug assist and are connected through an exhaust switch to an exhaust outlet. Thus, injection of pressurized air into the cavity through the inlet, creates an air flow that moves along the surface of the plug assist and is then exhausted through the second passageways. By suitably adjusting the pressure of the first air source, the air flow around the plug assist creates a cushion between the plug assist and the production sheet as the mold is closing thereby preventing contact between each plug assist and its respective work piece. Preferably, the first air source has a heating means sufficient to raise the temperature of air from the first air source to a temperature in the range of 340° F. to 360° F. and at a pressure range of at least 40 psi; the temperature of approximately 350° F. has been found quite suitable. The second air source is at higher pressures, and are set at temperatures at 330° F. and above. Preferably, the air temperature is in a range of 350° F. to 400° F., inclusive, with pressures of 100 psi to 175 psi, inclusive. The third air source is preferred to be at ambient temperatures or less, and may preferably be refrigerated air which is cooled and dried to a temperature of approximately 0° F. Further, the preferred apparatus includes a preheating oven which is capable of preheating the production sheet of material to have initial crystallization of at least ten percent (10%). In the preferred invention, the first, second and third air sources can be a common source of service air or other gas that is regulated through separate pressure regulators to provide the switched air for the forming apparatus.

Accordingly, then, the board method according to the present invention is directed toward a process for thermoforming articles out of a production sheet of plastic material by means of a molding apparatus including a female mold section and a male mold section which are cyclically movable between an open position and a closed position. In such apparatus, the female mold section has a cavity with an interior surface configured in the shape of an article to be formed and has a first passageway which communicates with the cavity and which is switchably connected to a source of negative pressure. The production sheet is positionable across the cavity so that it has a first side facing the female mold section and a second side facing the male mold section.

The method of thermally enhancing the crystallization of the plastic material according to the broad method of the present invention, then, comprises the steps of first indexing the production sheet into position across the cavity with the mold apparatus in the open position, and initially applying negative pressure to the cavity on the first side of the sheet while flowably directing a forming stream of gas, which may conveniently be air, against the second side of the sheet as the molding apparatus closes in order to force the production sheet into the cavity and against the interior sidewall thereof as a conformed sheet portion. This forming stream of air is applied against the sheet at an elevated temperature of at least 325° F. and at a positive pressure. The next step in the process is the pressurizing of the cavity on the second side of the conformed sheet portion after the mold apparatus is in the closed position by a second gas, which again may be air, at a second temperature of at least 325° F. and at a second pressure of at least 125 psi. The conformed sheet portion is held in position in the pressurized cavity for a period of time sufficient to allow the plastic material to obtain a desired level of crystallization after which a step of flowably directing a cooling stream of gas, e.g. air, against a second side of the conformed sheet is started to begin to cool the conformed sheet portion to arrest further crystallization of the plastic material. This cooling stream of gas is at a selected third temperature and pressure. Finally, the mold apparatus is opened and the conformed sheet portion is ejected from the cavity as the molded article.

In the more detailed aspects of the preferred method, the first pressure of the forming stream of air is sufficient to prevent the production sheet from contacting the male mold section as the molding apparatus closes. To this end, it is preferable that the male mold section be provided with a plug assist sized for advancement into the cavity such that the plug assist has an upper surface facing the second side of the sheet and a surrounding side surface. This plug assist is preferably provided with at least one longitudinal inlet having an inlet orifice centrally located on the upper surface and a plurality of second passageways having passageway orifices located alongside the side surface. The step of flowably directing the forming stream of gas is then accomplished by switchably connecting the inlet in fluid communication with a pressurized source of first gas while connecting said second passageways in fluid communication with an exhaust outlet. With this configuration, the step of configuring the cavity on the second side of the conformed sheet portion is accomplished by switching the inlet out of communication with the first source of gas and preventing passage of gas through the inlet while switching the second passageways out of communication with the exhaust outlet and into fluid communication with a pressurized source of the second gas. Furthermore, the step of directing a cooling stream of gas is accordingly accomplished by switchably connecting the inlet in fluid communication with a pressurized source of cooling gas while connecting the second passageways in fluid communication with the exhaust outlet.

Other features of the preferred method include the step of preheating the production sheet to a temperature sufficient to have a crystallization level of at least ten percent (10%) as it is indexed in the position across the cavity. It is preferable that the elevated temperature of the forming stream of gas be between 340° F. and 360° F., inclusively. Furthermore, it is preferred that the second temperature of the second pressurizing gas is selected to be between 350° F. and 400° F., inclusively. Preferably, the second pressure is between 100 psi and 175 psi, inclusively. The third temperature of the cooling gas may be less than ambient, but is preferred to be less than or equal to 32° F.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention relates to molding apparatus adapted for thermoforming plastic materials and is specifically directed to a molding apparatus that may be implemented to produce crystallized PET articles, such as dual-ovenable trays and the like. Thus, while the present invention is described with respect to the production of CPET trays, it should be appreciated that the technology described herein may be implemented in other thermoforming processes, specifically those designed for crystallization of amorphous PET. The apparatus, and even the method described and claimed herein may also be suitable for forming other plastic materials such as olefin based materials, engineering resins, and the like, which are otherwise difficult to form.

In order to best understand the present invention, then, it is helpful to first consider the apparatus and method of the prior art. FIGS. 1-4 show typical prior art mold used in the fabrication of CPET articles, such as dual ovenable trays. Here, mold 10 includes a female mold section 20 and a male mold section 60 which are reciprocally movable between the open position shown in FIG. 1, and a closed position shown in FIG. 3. A sheet of plastic material is provided as production sheet 12 which is supported for advancement through molding apparatus 10 and may be supported, during the molding step, by means of a clamp structure 14 having large area openings 16 formed therein.

Female mold sections 20 includes the female tool 22 that includes a plurality of cavities 24 each having an interior sidewall 26 and bottom wall 27 configured in the shape of the article to be formed. Adjacent cavities are separated from one another by wall portions 25. Female tool 22 is heated by means of hot oil circulating through oil manifold 28 formed in wall portions 25 so that female tool 22 may be maintained at a selected elevated temperature. Female tool 22 is mounted by means of stand-offs 30 to a bolster 32 which in turn is mounted to machine platen 34. A vacuum manifold 40 is connected to both a vacuum and an air eject supply and control and includes a plurality of first passageways 42 which communicate with respective cavities 24 to establish fluid communication for negative pressure and air eject pressure from the vacuum and air eject supply and control system. Thus, for purposes of this description, the terms "vacuum" and "negative pressure" means those pressures at less than ambient; similarly, the term "positive pressure" means pressures greater than ambient.

Male mold section 60 includes male tool 62 that is mounted by stand-offs 64 to bolster 66 which, in turn, is mounted to machine platen 68. Male tool 62 includes a plurality of plug assists 70 which are separated from one another by open regions 72. Each plug assist 70 is sized and oriented for advancement into a respective cavity 24 in female tool 20, and each plug assist 70 includes an exterior working surface 74 that operates to help form the molded article out of production sheet 12. A main pressure manifold 80 is switchably connected to a low pressure source of cool air and includes a plurality of second passageways 82 which are formed adjacent each plug assist 70 with second passageways 82 in fluid communication with respective cavity 24 when the mold is in the closed position, as described below.

Figures 1, 2:
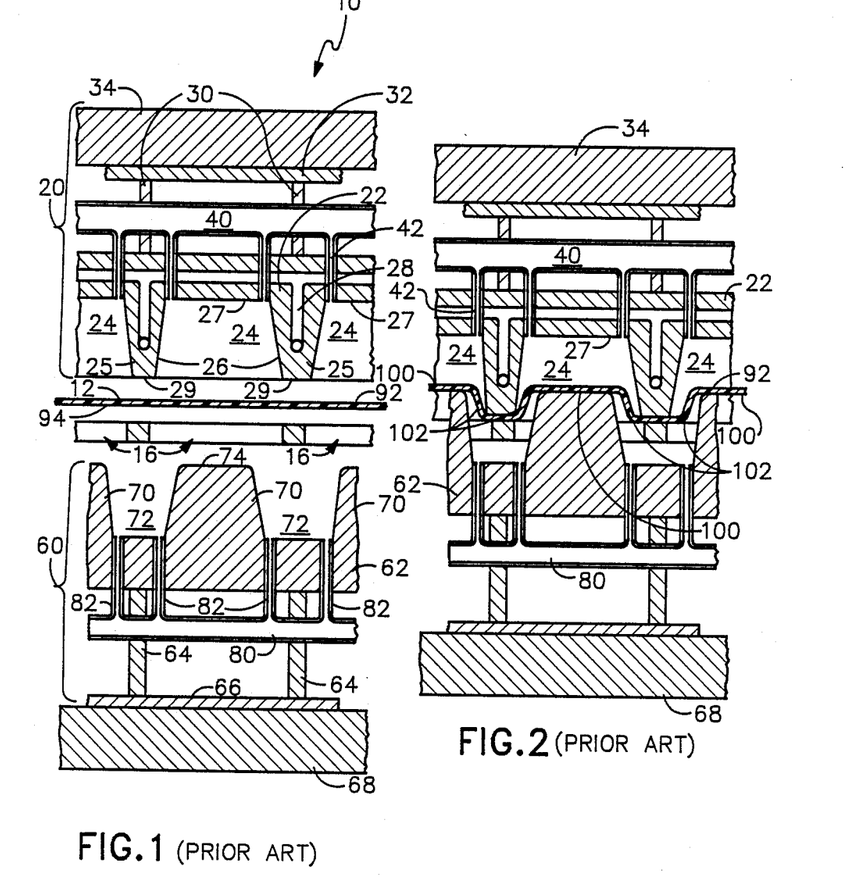
FIG. 1 is a cross sectional view of a single step molding apparatus including reciprocating female and male sections in the open position, as is used in the prior art.
FIG. 2 is the prior art apparatus shown in FIG. 1 in an intermediate position in the beginning of a closing cycle.

In operation, production sheet 12 is first indexed into position when the mold is in the open position shown in FIG. 1. At the start of the production cycle, clamp 14 clamps production sheet 12 against the outer surfaces 29 of each wall portion 25, as is shown in FIG. 2 with a first surface 92 of sheet 12 facing cavity 24. Each sheet portion surrounded by opening 16 thus defines a production blank to be formed by each cavity and plug assist set. To this end, it should be thus appreciated that each opening 16 of clamp 14 is configured to surround the open mouth of a respective cavity 24. Also, at this time, male tool 60 moves towards female tool 22 so that a respective plug assist 70 bears against a lower or second surface 94 of production sheet 12. Each plug assist 70 advances into a respective cavity 24. During the closing process, vacuum manifold 40 is connected to a negative pressure source tending to draw production sheet 12 into cavities 24. Minimum pressure manifold 80 is opened to atmosphere. As this process occurs, trays 100 begin to form with sidewall portions 102 being stretched along sidewalls 26.

Figures 3, 4:
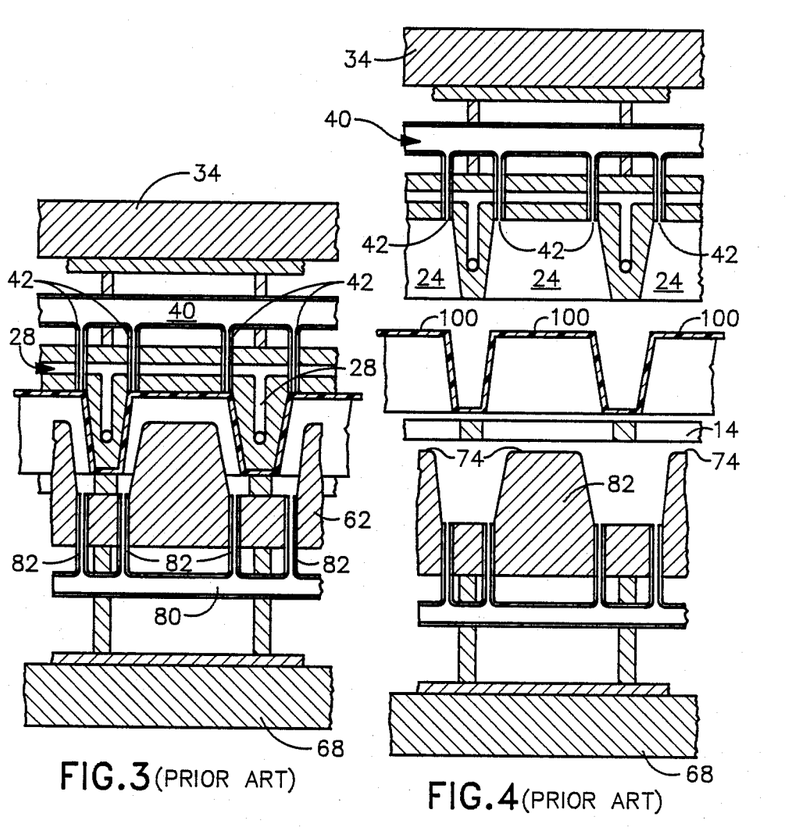
FIG. 3 is a cross sectional view of the apparatus shown in FIGS. 1 and 2 in the fully closed position.
FIG. 4 is a cross sectional view of a molding apparatus shown in FIGS. 1-3, shown in the fully open position after the molding operation has been completed.

As the mold further closes, from the position shown in FIG. 2 to the position shown in FIG. 3, pressure manifold 80 is connected to a source of air at a low positive pressure, typically at approximately 10 psi. This low pressurized air helps force surface 92 of production sheet 12 against the sidewall 26 and the bottom wall 27 of a respective cavity 24. It should b appreciated that each cavity 24 is accordingly pressurized to the pressure of manifold 80 by the introduction of the pressurized air through the passageways 82. Furthermore, due to the intimate contact of each production blank along sidewalls 26 and bottom wall 27 of each respective cavity 24 of female tool 22, PET production sheet 12 undergoes further crystallization due to the temperature of female tool 22 that is heated by hot oil circulating through manifold 28. After sufficient crystallization, mold sections 20 and 60 move apart, as is shown in FIG. 4, so that male tool 62 moves out of female tool 22. Vacuum manifold 40 is then switched to a positive pressure air eject system at a pressure above ambient pressure so that a burst of pressurized air is applied to cavity 24 through first passageways 42 thus helping to eject the formed trays 100 from the respective cavities 24. Production sheet 12 is then again indexed so that the ensemble of trays 100 move out of molding apparatus 10 and an unformed section of production sheet 12 advances into molding apparatus for the subsequent cycle.

As the ordinarily skilled person in this field will recognize, there are numerous criticalities and special problems inherent in the simultaneous thermoforming of the molded plastic article and the crystallization of the substrate medium. Given the fact that production efficiency is dependent upon the number of cavities in the mold and the mold cycle time, it is readily apparent that, for a given mold, efficiency is directly dependent upon the cycle time of the mold. Crystallization of the substrate medium is a function of the temperature of the environment into which it is placed and the time it remains at such temperature. Optimum crystallization is in the range of twenty-eight percent (28%) to thirty percent (30%), although fair results are obtained when the crystallization level is between twenty percent (20%) and forty percent (40%). As a result, typical methods use female molds which are heated to between 330° F. and 350° F. However, the simple placement of amorphous PET in a mold heated within this range requires fairly long cycle times, on the order of 12 seconds, to crystallize the formed sheet portion to the desired level.

To shorten the cycle time, manufacturers of the resin materials that are used to produce the amorphous PET production sheet add nucleating agents to the resin. These agents stimulate the rate of crystallization once the sheet is placed in the heated mold. Additionally, common production techniques employ the method of preheating the amorphous sheet as it is being indexed into the molding apparatus to initiate crystallization. These two techniques of preheating the sheet and including nucleating agents into the substrate material have been successful in reducing cycle times down to approximately six seconds. Indeed, it has been reported that forming cycles generally are in the range of five to eight seconds although formers admit that faster cycles of approximately three seconds would be useful.

Preheating the production sheet prior to forming the molded article is not, however, without its problems. It is well known that the rigidity of the sheet is dependent upon its level of crystallization and the higher the crystallization level, the more resistive the sheet is to thermal forming. With reference to FIG. 2, if the production sheet 12 is crystallized at an excessive level, it is found that the flow of material over upper surface 74 of plug assist 70 does not occur and that the sidewalls 102 of trays 100 are undesirably stretched so that the sidewalls 102 become unsuitably thin or are otherwise destroyed.

Additional factors in the prior art method and apparatus affect the molding process. For example, certain physical parameters relating to plug assists can affect molding. These parameters include the surface finish of the plug assist which, by its roughness or smoothness, determines how much material slips over the plug. The temperature of the plug assist is also important since, for a pre-crystallized sheet, the contact of the cooler plug assist 70 with the sheet 12 tends to arrest the crystallization. This is especially true for heat conducting plugs such as those formed out of aluminum. Some thermoformers attempt to remedy this situation by manufacturing plug assists out of an insulating structural foam material such as syntatic foam manufactured by the 3M Corporation of Minneapolis, Minnesota. This insulating foam is utilized since it is generally held that the surface of the plug will thus take on the temperature of the incoming plastic sheet and will not drain the heat away.

Another significant factor affecting the cycle time is the temperature and pressure of the pressure-forming air injected into cavity 24 in the forming process by pressure manifold 80 and passageways 82. Should high pressure air be used, this pressure air tends to cool the sheet being formed which arrests crystallization. Accordingly, pressure forming air is typically selected to be less than 10 psi. However, with the low pressure forming air, there is only a low force tending to conform the plastic production sheet to the shape of the mold. Accordingly, the production sheet must have a very low level of pre-crystallization; otherwise, the combination of the vacuum source and the low pressure forming air will not be sufficient to conform the plastic sheets to the shape of the cavity.

Another problem confronted by the prior art occurs during the ejection stage of the molded trays 100 from the female mold section 20. At the temperatures at which the trays 100 are formed, the material is still in a flexible plastic state. Thus, the articles need to be supported during ejection and are subject to deformation. The existing prior art molding processes and apparatus do not include means for cooling the ejected trays other than that some devices implement fans which circulate ambient air at atmospheric pressure around the trays. Further, since the plastic material is still very hot when it is ejected from the female mold, crystallization continues in the sheet so that it is difficult to control crystallization to obtain the desired optimal range for the finished article.

The present invention, then solves a significant number of these problems in a simple manner that can be implemented on new apparatus or which may be constructed as a modification of existing apparatus. In the preferred embodiment of the present invention shown in FIGS. 5-9, then, a molding apparatus 110 includes a female mold section 120 and a male mold section 160. Production sheet 112 which is supported for advancement through molding apparatus 110 by means of a chain rail system as is known in the art and which forms no part of this invention. A clamping structure 114 is oriented in a molding apparatus 110 and has large area openings 116 formed therein. Female mold section 120 includes a female tool 122 having a plurality of cavities 124 each having a bottom wall 127 and an interior sidewall 126. Cavities 124 are separated from one another by means of wall portions 125. Female tool 122 is heated by hot oil circulating through oil manifold 128 so that it is maintained in a heated condition sufficient to crystallize production sheet 112. Female tool 122 is mounted by means of stand-offs 130 to a bolster 132 which in turn is mounted to machine platen 134. A vacuum manifold 140 is connected to a vacuum/air eject supply and control system and includes a plurality of first passageways 142 in communication with respective cavities 124 to establish fluid communication for negative pressure and air eject pressure from the vacuum and air eject supply and control system.

Male mold section 160 includes a male tool 162 that is mounted by means of stand-offs 164 to bolster 166. Bolster 166 is then mounted to machine platen 168. Male tool 162 includes a plurality of plug assists 170 which are separated from one another by open regions 172. Each plug assist 170 is sized and oriented for advancement into a respective cavity 124 in female tool 120 and includes an exterior surface 174. A main pressure manifold 180 includes a plurality of second passageways 182 with manifold 180 being switchable between a pressurized source of air and an exhaust outlet.

Figures 5, 6:
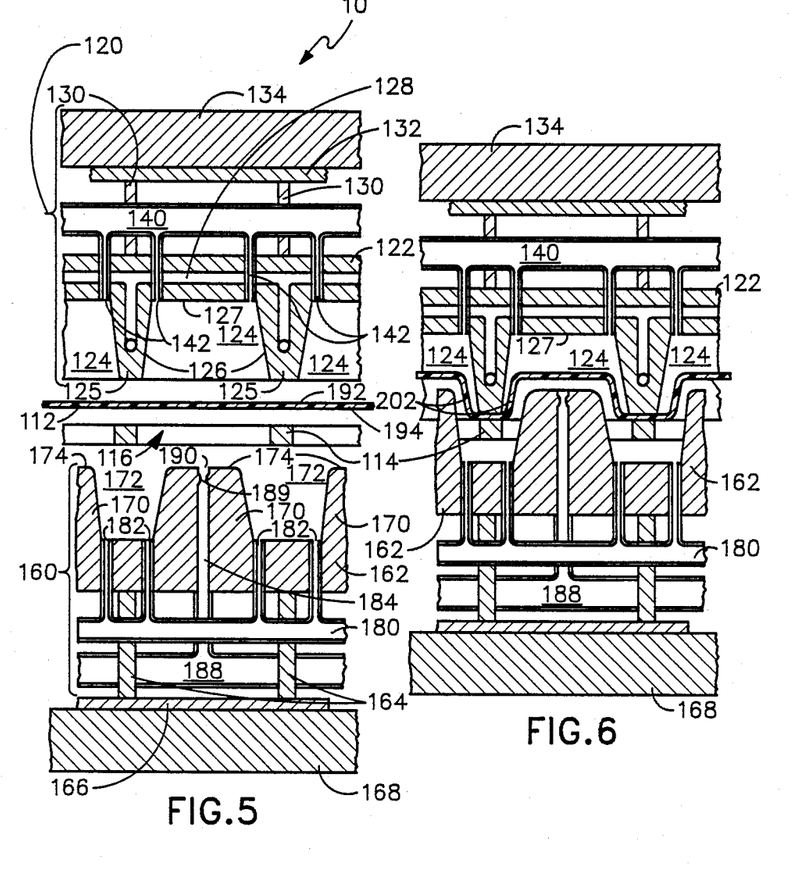
FIG. 5 is a cross sectional view similar to FIG. 1, showing the modifications to the prior art to create the molding apparatus according to the present invention.
FIG. 6 is a cross sectional view similar to FIG. 2 showing the molding apparatus of FIG. 5 in the intermediate position.
Figure 9:
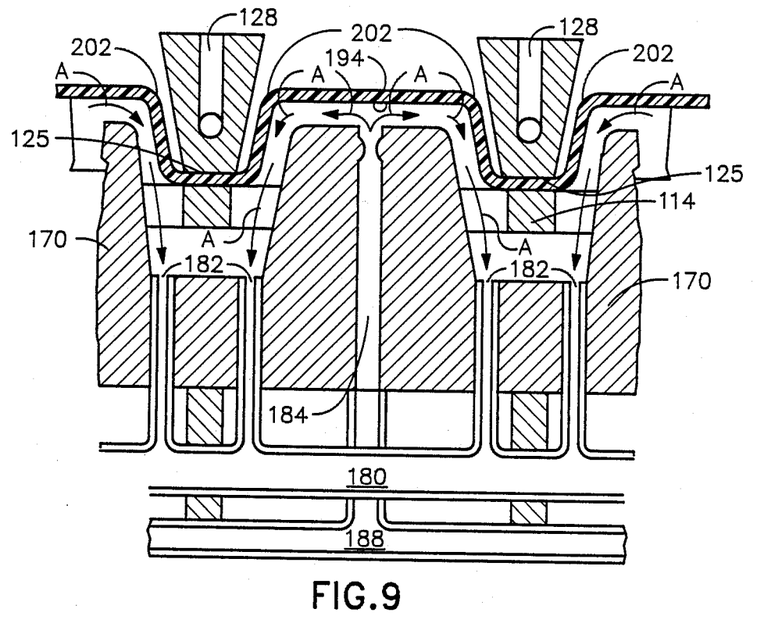
FIG. 9 is an enlarged view of a single cavity and plug assist of the mold shown in FIGS. 5-8, shown in the partially closed state.

The preferred embodiment of the present invention further modifies the typical plug assist as is best shown in FIGS. 5 and 9. This modification includes at least one inlet 184 extending longitudinally through plug assist 170. These inlets 184 are in fluid communication with a plug assist manifold 188 which is switchably connected between a pair of pressurized air sources, as described more thoroughly below. Each inlet 184 includes a restriction orifice 189 and opens, at a mouth 190 onto the surface 174 of plug assist 170. It should be understood that at least one inlet 184 is provided for each plug assist 170. However, depending upon the particular size and shape of the plug assist for a specific production apparatus, it is within the scope of the present invention to include a plurality of inlet 184 for each plug assist 170 with the respective mouths 190 being distributed uniformly over the surface 174 to establish uniform air flow over surface 174, as described more thoroughly below.

Figure 10:
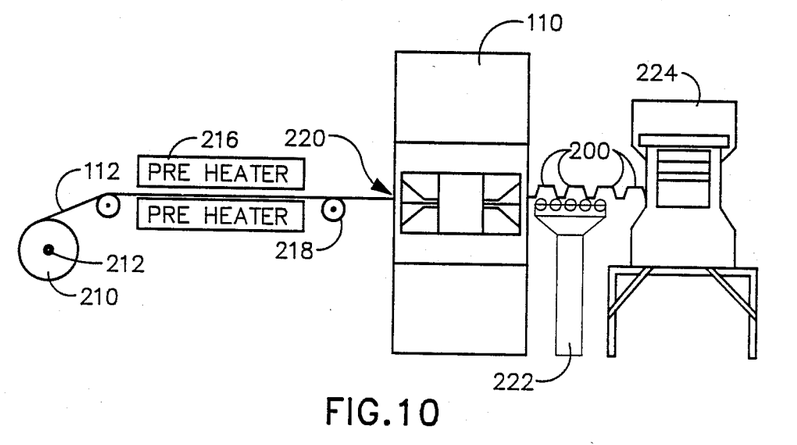
FIG. 10 is a diagrametric view of the molding apparatus used in combination with a preheater and a cutting/trimming machine as the present invention would be used on a production line.
Figure 11:
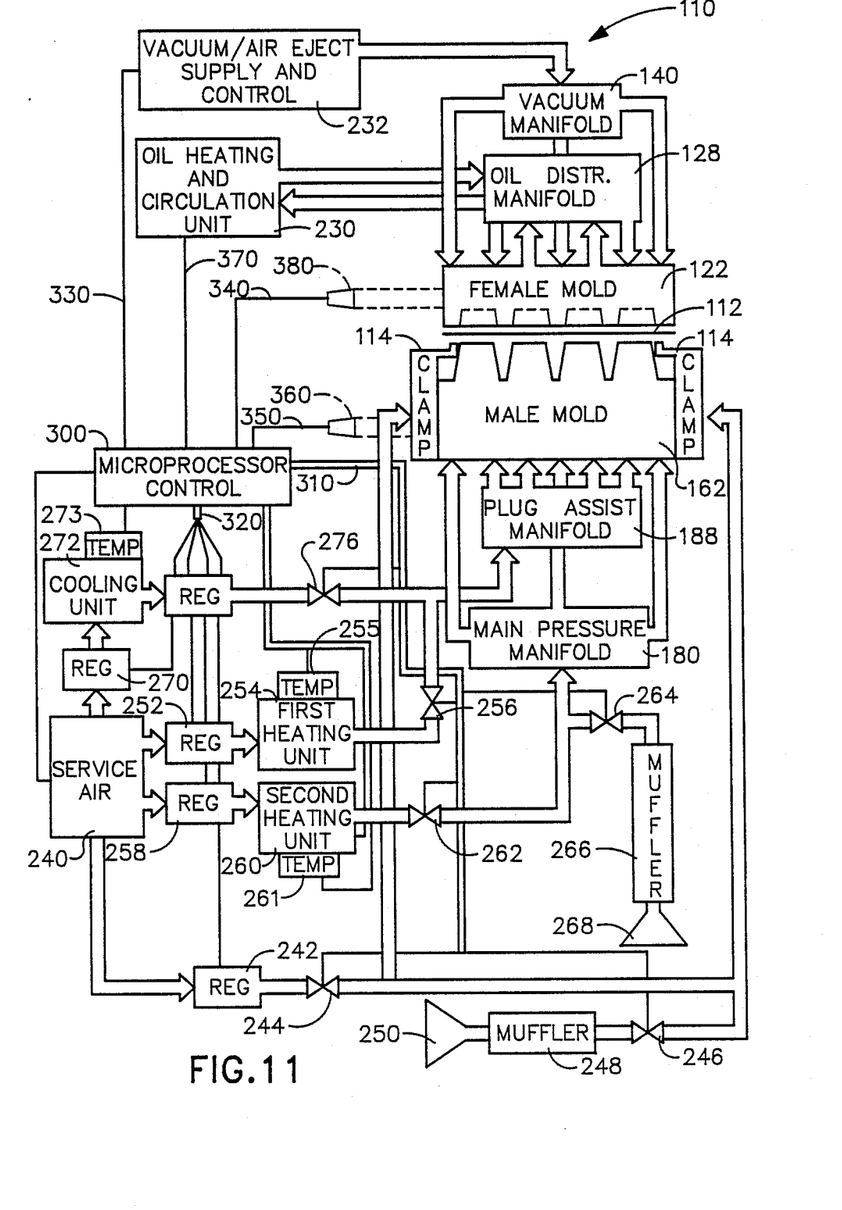
FIG. 11 is a diagrammatic view of the molding apparatus according to the present invention showing the mold and pressure control systems.

Before discussing the operation of the preferred apparatus 110 shown in FIGS. 5–], the entire assembly of the present invention may be appreciated from a review of FIGS. 10 and 11. In FIG. 10, it should be understood that the production sheet 112 is stored as a supply roll 210 journalled on an axle 212. Alternately, it should be understood that sheet 112 may be supplied by means of an extrusion process as is commonly used in the thermoforming industry on an in-line forming system. Production sheet 112, as it unwinds off supply roll 210, is carried by a conventional chain conveyor passing over a sprocket roller 214 and then passes through a preheater 216 to elevate the temperature of sheet 112 and to initiate the crystallization process. The chains carrying the sheet are then supported by a second roller 218. Sheet 112 is indexed at 220 into molding apparatus 110, and the molded trays 200 formed by molding apparatus 110 are simultaneously indexed out of molding apparatus 110. After exiting the molding apparatus 110, the formed tray set passes over a support 222 where the trays are presented to a cutting machine 224 which severs the trays from one another and trims the individual trays.

The complete molding apparatus 110 is represented diagrammatically in FIG. 11. Here, it should be appreciated that production sheet 112 is indexed into position for molding between female mold 122 and male mold 162. From the above description, it should be further appreciated that female mold 122 is heated, preferably to at least 325° F., by means of not oil circulating from oil heating and circulation unit 230 through oil distribution manifold 128. Furthermore, female mold 122 is connected to vacuum and air eject supply and control unit 232 by means of vacuum manifold 140. Vacuum/air eject supply and control unit 232 supplies negative pressure during the first of the molding cycle through first passageways 142, as discussed above with respect to FIGS. 5 and 6; as the mold is opening, vacuum/air eject supply and control applies pressurized air at approximately 20 psi to eject the formed trays from the female cavities.

As was described above, male mold 162 is connected to a plurality of air sources, both through inlets 184 and second passageways 182. It should be understood that any suitable forming gas could be used for the pressurized air source. With greater specificity, then, and with reference to FIG. 11, a common source of air or service air 230 may be provided as is standard with most thermoforming machines. This service air is typically used to drive the clamp, such as clamp 114, as well as to open and close female mold 122 and male mold 162 during the forming process. Thus, as is seen in FIG. 11, service air 240 is connected through a pressure regulator 242 and a valve 244 to clamp 114 with pressurized air from clamp 114 also being vented through valve 246 and muffler 248 to exhaust outlet 250. Thus, valve 246 may be closed and valve 244 may be opened to cause clamp 114 to clamp production sheet 112 after which valve 244 is closed and valve 246 opened to vent the pressurized air thereby allowing clamp 114 to release sheet 112.

Service air 240 also provides heated and refrigerated air to male mold 162 in the preferred embodiment of the present invention. As is seen in FIG. 11, service air 240 is connected through a pressure regulator 252 to a first heating unit 254 which in turn is connected through valve 256 to plug assist manifold 188. Thus, first heating unit 254 provides a first source of air which applied to male mold 162 through plug assist manifold 188. First heating unit 254 is provided with a temperature sensing and control unit 255.

Service air 240 is also connected through regulator 258 to a second heating unit 260 which in turn is connected to main pressure manifold 180 through valve 262. Accordingly, second heating unit 260 provides a second source of air at a second temperature and pressure which is applied through main pressure manifold 180 to second passageways 182. Second heating unit 260 is provided with a temperature sensor and control unit 261. Main pressure manifold 180 is also in fluid communication through a valve 264 and muffler 266 to an exhaust 268.

Inlets 184 are also selectively in communication, through plug assist manifold 188, to a source of refrigerated air. To this end, service air 240 is connected through regulator 270 to a cooling unit 272. Cooling unit 272 provides a third source of air at a third temperature and pressure, with cooling unit 272 being connected through valve 276 to plug assist manifold 188.

Cooling unit 272 is provided with a temperature sensor and control 273.

The operation of molding apparatus 110 is preferably controlled by microprocessor control 300 which is connected through wiring harness 310 to valves 244, 256, 262, 264 and 276. These valves are preferably solenoid-type valves of a type known in the art which may be opened and closed by signals from microprocessor control 300. Likewise, pressure regulators 242, 252, 258 and 270 are connected to microprocessor control 300 by means of wiring harness 320 which senses and controls the various pressures at the respective pressure regulators. Also, microprocessor control 300 is connected by suitable wiring to temperature sensor and control units 255 and 261 of heating units 254 and 260, respectively, and microprocessor control 300 is also connected to temperature sensor and control unit 273. Thus, microprocessor control 300 controls the temperature and pressures presented to both main pressure manifold 180 and plug assist manifold 188. To this end also, microprocessor control 300 is electrically connected to service air 240, as is shown in FIG. 11, so that it may maintain service air 240 in a pressurized state.

If desired, microprocessor control 300 may also be electrically connected to vacuum/air eject supply and control 232 by lead 330 in order to switch vacuum manifold 140 between the negative pressure source and the air eject pressure source, as is known in the art. Microprocessor control 300 activates and deactivates clamp 114 by operating valves 244 and 246. Leads 340 and 350 connect microprocessor control 300 to drives 360 and 380 (shown in phantom) which open and close male mold 162 and female mold 122, as is known in the art. Finally, microprocessor control 300 is connected through lead 370 to oil heating and circulation unit 230 so that it may monitor the temperature of the hot oil provided to oil distribution manifold 128.

The operation of the molding apparatus according to the preferred embodiment of the present invention may now be more readily appreciated with a review of FIGS. 5-11. As is shown in FIG. 10, amorphous PET in the form of production sheet 112 may be supplied off a roller 210 or, as is understood in the art, from an extrusion machine. This sheet 112 is passed through a preheater 216 where it is initially heated to a sufficient temperature to initiate crystallization after which it is passed into molding apparatus 110 at location 220. At this point, it is preferred that the level of crystallization of sheet 112 be at least ten percent (10%) and can, in the preferred embodiment, be as much as fifteen percent (15%). It should be understood that this initial crystallization is highly desirable, but not essential, to implementation of the method according to the broadest form of the present invention.

As a section of production sheet 112 is indexed into molding apparatus 110, molding apparatus 110 is in the position shown in FIG. 5. At this step in the process, microprocessor 300 closes mold section 120 which causes wall portions 125 to meet surface 192 of sheet 112. Clamp 114 is then operated to clamp sheet 112 against wall portions 125 with that portion of sheet 112 surrounded by opening 116 defining a production blank for formation into a CPET tray. I should be understood that valve 246 is closed as clamp 114 is activated by valve 244.

Microprocessor control 300 then begins to close mold section 160 onto sheet 112. At this point, valves 256 and 264 are open and valves 276 and 262 are closed. Thus, as is best shown by arrows "A" in FIG. 9, a flowing stream of air is directed against lower surface 194 and is exhausted through second passageways 182 and main pressure manifold 180 so that it is exhausted through exhaust 268. As is shown in FIG. 9, air flow, as indicated by arrows "A", form a cushion upon which production sheet 112 rides so that plug assist 170 does not come in contact with sheet 112. This flowing cushion of air thus allows more uniform stretching of production sheet 112 about portions 202 as each production blank is formed into a tray. Due to this uniformity of stretching and the avoidance of contact between plug assist 170 and sheet 112, sheet 112 can have a higher degree of crystallization. Furthermore, this first air that defines the forming stream of air is at least 325° F. but is preferably between 340° F. and 360° F., inclusively. It is important that this flowing stream of flowing air be of suitable pressure to create the air cushion discussed above. In practice, it has been found that, in a mold having twenty cavities and twenty plug assist with each plug assist having a single inlet for having an orifice size of 0.125 inches, the initial pressure of manifold 188 from first air source 254 may be on the order of 40 psi. During this forming operation, vacuum manifold 140 is connected to the vacuum side of vacuum/air eject supply and control 232 so that the combination of the vacuum applied to cavity 124 and the air pressure from the forming stream of air help configure each production blank into the shape of cavity 124.

Figures 7, 8:
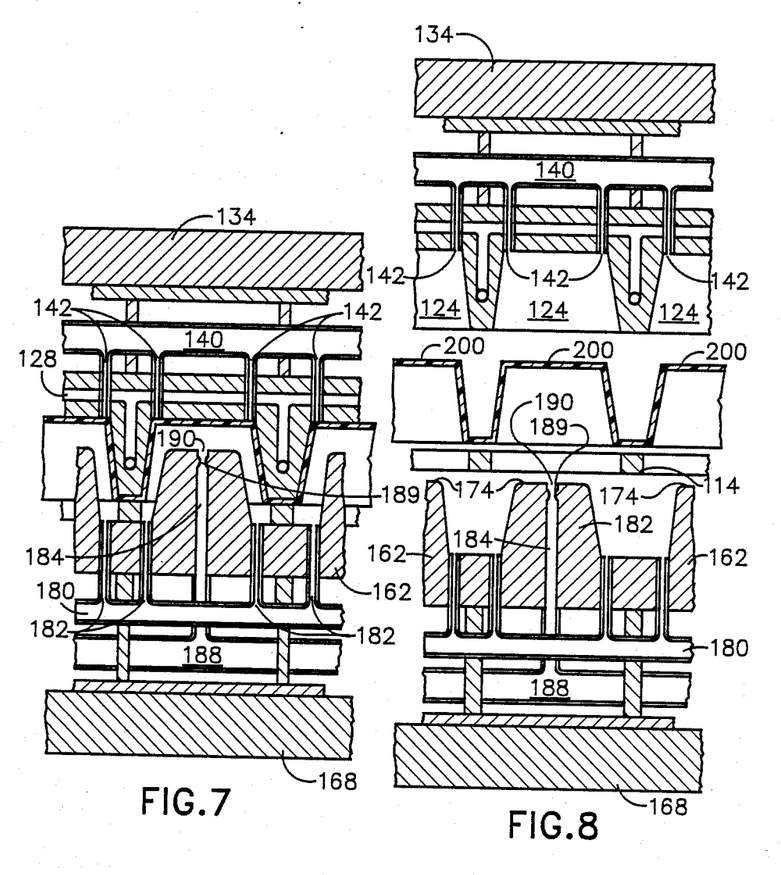
FIG. 7 is a cross sectional view of the apparatus shown in FIGS. 5 and 6 in the fully closed position, similar to FIG. 3.
FIG. 8 is a cross sectional view of the molding apparatus shown in FIGS. 5-7 in the fully opened position after molding is completed.

Once molding apparatus 110 closes to the position shown in FIG. 7, valves 256 and 264 are closed and valve 262 is opened so that the cavity 124 on the side of 194 of production sheet 112 is pressurized with high pressure, heated air. To this end, it is preferred that this second pressure is between 100 and 175 psi, inclusively and is at a temperature of between 350° F. and 400° F., inclusively.

At this stage, it should be fully appreciated that the rate of crystallization of sheet 112 is enhanced, for several reasons. First, by avoiding contact between the plug assist and the sheet, the initial crystallization is not arrested as the mold is closing so that crystallization continues without interruption. Furthermore, initial pre-crystallization can be at a higher level due to the uniform stretching of portions 202 of each production blank portion of sheet 112. Likewise, the warm forming stream of air can continue the crystallization process while the pressurization of the cavity can be at a high temperature and pressure.

With such rapid crystallization, though, it is necessary to prevent over-crystallization, and this is accomplished in the preferred embodiment of the present invention, again by the plug assist manifold 188. Once the desired level of crystallization has been reached, valve 262 is closed and valve 264 is opened so that the cavity 124 is placed in communication with exhaust outlet 268 through main pressure manifold 180. Valve 276 is opened so that cold air from cooling unit 272 is injected into cavity 124 through each inlet 184 so that cold air flows across surface 194 of each formed tray 200. This cold air provides two advantages over the prior art apparatus and method. First, the cold air rigidifies each tray 200 so that, as molding apparatus 110 begins to open, first passageways 142 are connected through manifold 140 to the air eject portion of vacuum/air eject supply and control 232 so that the ensemble of trays 200 is ejected out of each cavity 124. Since the ensemble of trays is more rigid, undesired deformation of the trays due to continued plasticity is avoided. Furthermore, the cold air blowing against tray 200 rapidly arrests crystallization so that the level of crystallization may be fairly well controlled and over-crystallization prevented. To this end, then, it is preferred that this third air is less than ambient temperatures, which in many fabrication plants is approximately 80° F. Good results have resulted where such temperature is less than 32° F., and even better were obtained at 0° F. Thus, it is believed that best results can be made where the third source of air is as cold as reasonably obtainable.

From the foregoing method and apparatus, it should be appreciated that the cycle time of molding apparatus 110 can be greatly reduced over existing prior art apparatus and method. With the system described above, highly controllable crystallization levels of between 28% and 32% have been obtained with cycle times of approximately three seconds. This cycle time provides almost a 100% improvement over the prior art method and apparatus known to the inventor and is accomplished by the inclusion of two additional air source which may be conveniently connected to the service air and by the provision of an inlet through each plug assist with these inlets being connected to a common plug assist manifold. Accordingly, it should be appreciated that this apparatus may be built as original equipment. It is also a fairly simple matter, certainly to the ordinarily skilled person in this field of art, to modify existing apparatus to incorporate the present invention as taught herein.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. In a process for thermoforming articles out of a production sheet of plastic material by a mold apparatus including a female mold section and a male mold section cyclically moving between an open position and a closed position wherein said female mold section has a cavity with an interior surface configured in the shape of an article to be formed and has a first passageway communicating with said cavity and switchably connected to a source of negative pressure whereby said production sheet may be positioned across said cavity with a first side facing said female mold section and a second side facing said male mold section, a method of thermally enhancing crystallization of the plastic material during formation of the article comprising the steps of:

indexing said production sheet into position across said cavity with said mold apparatus in an open position;

initially applying negative pressure to said cavity on the first side of said sheet while flowably directing a first forming stream of gas against the second side of said sheet as said molding apparatus closes to force the production sheet into said cavity and against the interior sidewall thereof as a conformed sheet portion, said forming stream being at an elevated temperature of at least 325° F. and at a first positive pressure;

pressuring the cavity on the second side of the conformed sheet portion after the mold apparatus is in the closed position by a second gas at a second temperature of at least 325° F. and at a second pressure higher than the first pressure:

holding said conformed sheet portion in said pressurized cavity in the presence of the second gas for a period of time sufficient to allow the plastic material to attain a desired level of crystallization;

flowably directing a cooling stream of gas against the second side of the conformed sheet portion to begin to arrest further crystallization of plastic material at a third temperature and third pressure; and opening said mold apparatus and ejecting the conformed sheet portion from the cavity as said article.

2. A method according to claim 1 wherein the first pressure of said forming stream of gas is sufficient to prevent the production sheet from contacting the male mold section as the molding apparatus closes.

3. A method according to claim 2 wherein the male mold section is provided with a plug assist sized for advancement into said cavity, said plug assist having an upper surface facing said second side and a surrounding side surface and providing at least one inlet having an inlet orifice centrally located on the upper surface and a plurality of second passageways having passageway orifices located alongside the side surface, the step of flowably directing the forming stream of gas accomplished by switchably connecting said inlet in fluid communication with a first pressurized source of the first gas while connecting said second passageways in fluid communication with an exhaust outlet.

4. A method according to claim 3 wherein said step of pressurizing the cavity on the second side of the conformed sheet portion is accomplished by switching the inlet out of communication with said first source of gas and preventing passage of gas through the inlet while switching said second passageways out of communication with said exhaust outlet and into fluid communication with a pressurized source of the second gas.

5. A method according to claim 3 wherein the step of directing a cooling stream of gas is accomplished by switchably connecting said inlet in fluid communication with a pressurized source of cooling gas while connecting said second passageways in fluid communication with an exhaust outlet.

6. A method according to claim 1 including the step of preheating the production sheet to a temperature sufficient to have a crystallization level of at least ten percent (10%) as it is indexed into position across the cavity.

7. A method according to claim 6 wherein the production sheet has an initial level of crystallization of fifteen percent (15%).

8. A method according to claim 1 wherein the elevated temperature of the forming stream of gas is between 340° F. and 360° F., inclusively.

9. A method according to claim 1 wherein the second temperature is between 350° F. and 400° F., inclusively.

10. A method according to claim 1 wherein the second pressure at least 100 psi.

11. A method according to claim 1 wherein the third temperature is less than or equal to ambient temperatures.

12. A method according to claim 1 wherein the third temperature is less than or equal to 32° F.

* * * * *